US010412742B2

(12) United States Patent
Hirose

(10) Patent No.: US 10,412,742 B2
(45) Date of Patent: *Sep. 10, 2019

(54) SCHEMES FOR PROVIDING WIRELESS NETWORK

(71) Applicant: Empire Technology Development LLC, Wilmington, DE (US)

(72) Inventor: Haruto Hirose, Yokohama (JP)

(73) Assignee: Empire Technology Development LLC, Wilmington, DE (US)

( * ) Notice: Subject to any disclaimer, the term of this patent is extended or adjusted under 35 U.S.C. 154(b) by 34 days.

This patent is subject to a terminal disclaimer.

(21) Appl. No.: 15/449,019

(22) Filed: Mar. 3, 2017

(65) Prior Publication Data

US 2017/0181171 A1    Jun. 22, 2017

Related U.S. Application Data

(63) Continuation of application No. 13/922,780, filed on Jun. 20, 2013, now Pat. No. 9,591,691.

(51) Int. Cl.
*H04W 72/04* (2009.01)
*H04W 84/20* (2009.01)
*H04W 84/12* (2009.01)
*H04W 84/18* (2009.01)

(52) U.S. Cl.
CPC ....... *H04W 72/0486* (2013.01); *H04W 84/20* (2013.01); *H04W 84/12* (2013.01); *H04W 84/18* (2013.01)

(58) Field of Classification Search
None
See application file for complete search history.

(56) References Cited

U.S. PATENT DOCUMENTS

| 5,371,734 | A  | * | 12/1994 | Fischer | H04W 52/0274 370/311 |
| 8,089,884 | B2 | * | 1/2012  | Liu     | H04L 45/026 370/237 |
| 8,949,439 | B1 | * | 2/2015  | Sahuguet | H04W 88/04 709/227 |

(Continued)

FOREIGN PATENT DOCUMENTS

WO    2012172665    12/2012

OTHER PUBLICATIONS

"Deployment of new Wireless network", accessed at https://web.archive.org/web/20130605215442/http://prasonline.hubpages.com/hub/Deployment-of-new-Wireless-network, archived on Jun. 5, 2013, accessed on Mar. 23, 2017, pp. 6.

(Continued)

*Primary Examiner* — Jamaal Henson

(57) ABSTRACT

Technologies are generally described for providing a wireless local area network. In some examples, a method performed under control of a first device may include connecting to an access point that is configured to provide a wireless local area network, transmitting, to a second device, a request of connecting to the first device, receiving, from the second device, a response of connecting to the first device, configuring an ad-hoc network group including the first device and the second device based, at least in part, on a network load of the first device and a network load of the second device, and providing a wireless local area network to the second device included in the ad-hoc network group.

24 Claims, 10 Drawing Sheets

(56) References Cited

U.S. PATENT DOCUMENTS

| | | |
|---|---|---|
| 2005/0174938 A1 | 8/2005 | Richardson et al. |
| 2008/0113674 A1 | 5/2008 | Baig |
| 2012/0143978 A1 | 6/2012 | Coussemaeker et al. |
| 2013/0142059 A1* | 6/2013 | Di Girolamo .......... H04L 12/66 370/252 |
| 2013/0294284 A1* | 11/2013 | Popa .................... H04L 63/065 370/254 |
| 2014/0254499 A1 | 9/2014 | Hassan et al. |

OTHER PUBLICATIONS

"The Future of Hotspots: Making Wi-Fi as Secure and Easy to Use as Cellular," Cisco, pp. 9 (2012).

"Why is a Controller required in a Wireless Network," accessed at https://web.archive.org/web/20130506124428/http://www.excitingip.com/673/features-of-todays-centralized-wireless-wi-fi-networks/, posted on Mar. 8, 2010, pp. 10.

"WMM™ Power Save for Mobile and Portable Wi-Fi® Certified Devices," Wi-Fi Alliance, pp. 16 (Dec. 2005).

Gikaru, W.G., "Mobility-based Routing Overhead Management in Reconfigurable Wireless Ad Hoc Networks," Dissertation submitted in Dresden University of Technology, Department of Computer Science, pp. 143 (Nov. 2004).

\* cited by examiner

SCHEMES FOR PROVIDING WIRELESS NETWORK

CROSS-REFERENCE TO RELATED APPLICATION

This application is a continuation application under 35 U.S.C. § 120 of U.S. application Ser. No. 13/922,780, filed on Jun. 20, 2013, now U.S. Pat. No. 9,591,691. U.S. application Ser. No. 13/922,780 is herein incorporated by reference in its entirety.

BACKGROUND

It is generally preferable to use wireless local area networks (WLAN), such as a Wi-Fi network, for data transmission because the wireless local area networks (WLAN) are typically available at lower cost but with higher throughput than mobile networks. Recently, as portable devices which are enable to use the wireless local area networks (WLAN) increase, efforts for improving quality and usability of the wireless local area networks (WLAN) have drawn intense scrutiny.

SUMMARY

In an example, a method performed under control of a first device may include: connecting to an access point that is configured to provide a wireless local area network; transmitting, to a second device, a request of connecting to the first device; receiving, from the second device, a response of connecting to the first device; configuring an ad-hoc network group including the first device and the second device based, at least in part, on a network load of the first device and a network load of the second device; and providing a wireless local area network to the second device included in the ad-hoc network group.

In another example, a first device may include: an access point access unit configured to connect to an access point that is configured to provide a wireless local area network; an inviting unit configured to transmit, to a second device, a request of connecting to the first device; a receiving unit configured to receive, from the second device, a response of connecting to the first device; a network group configuring unit configured to configure an ad-hoc network group including the first device and the second device based, at least in part, on a network load of the first device and a network load of the second device; and a network providing unit configured to provide a wireless local area network to the second device included in the ad-hoc network group.

In yet another example, a computer-readable storage medium may store thereon computer-executable instructions that, in response to execution, cause a first device to perform operations including connecting to an access point that is configured to provide a wireless local area network; transmitting, to a second device, a request of connecting to the first device; receiving, from the second device, a response of connecting to the first device; configuring an ad-hoc network group including the first device and the second device based, at least in part, on a network load of the first device and a network load of the second device; and providing a wireless local area network to the second device included in the ad-hoc network group.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1A:
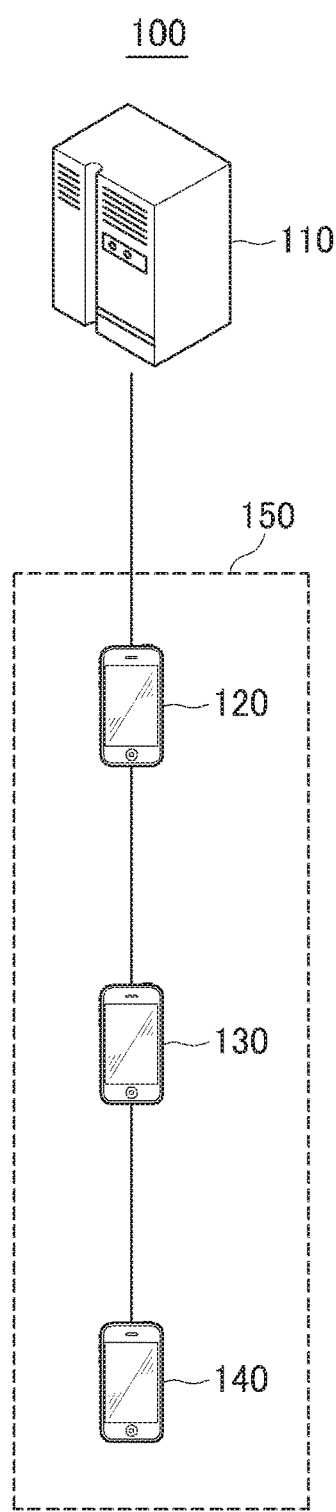
FIG. 1A schematically shows an illustrative example of a network communications environment including an access point, a first device, a second device and a third device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to schemes for providing a wireless local area network. Technologies are generally described for configuring an ad-hoc network group and providing a wireless local area network to at least one end device which is included in the configured ad-hoc network group.

In some examples, an end device may connect to an access point that provides a wireless local area network and then, the end device may serve as a provisional access point in relations with other end devices. In such a case, the end device may be called as a "master device." The end device may invite at least one other end device to connect to the end device and configure a provisional network group including the at least one other end device that connects to the end device. The end device may calculate a network load of the end device, a network load of each of the at least one other end device, and a sum of the network load of the end device and the network load of the at least one other end device. Then, the end device may configure an ad-hoc network group based on the calculated network load of the end device, the calculated network load of the at least one other end device, and the sum of the network load of the end device and the network load of the at least one other end device. For example, the end device may compare the calculated network load of the end device and the calculated network load of each of the at least one other end device. As a result of the comparison, if the difference between the calculated network load of the end device and the calculated network load of each of the at least one other end device is larger than a predetermined value, the end device may instruct one or more of the at least one other end device to leave the provisional network group. Thereafter, the ad-hoc network group may be configured, and the end device may act as an access point that provides a wireless local area network to the at least one other end device which is included in the ad-hoc network group.

Figure 1B:
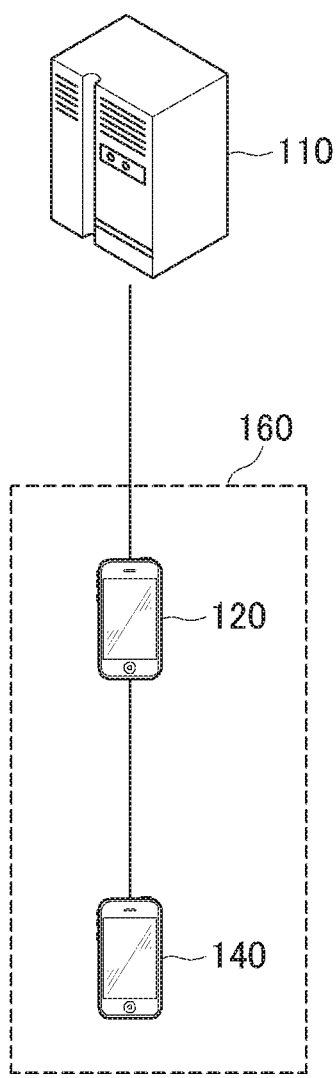
FIG. 1B schematically shows another illustrative example of a network communications environment including an access point, a first device and a third device, arranged in accordance with at least some embodiments described herein.

FIG. 1A schematically shows an illustrative example of a network communications environment 100 including an access point 110, a first device 120, a second device 130 and a third device 140, arranged in accordance with at least some embodiments described herein. FIG. 1B schematically shows another illustrative example of a network communications environment 101 including access point 110, first device 120 and third device 140, arranged in accordance with at least some embodiments described herein. By way of example, but not limited to, first device 120, second device 130 and third device 140 may respectively include any type of a mobile device, a portable device or a personal communication terminal which is able to use and control a wireless network such as a Wi-Fi network. As illustrated in FIGS. 1A and 1B, first device 120 may connect to access point 110 and access point 110 may provide a wireless local area network to first device 120. Thus, first device 120 may be a master device that provides the wireless local area network to other devices. Access point 110 may include a Wi-Fi access point and the wireless local area network provided by access point 110 may include a Wi-Fi network.

In accordance with at least one example embodiment, first device 120 may transmit a request of connecting to first device 120 to second device 130. Further, second device 130 may transmit a request of connecting to second device 130 to third device 140. As a response to the request, second device 130 which wants to connect to first device 120 may transmit, to first device 120, a response of connecting to first device 120 and first device 120 may receive the response from second device 130. Further, third device 140 which wants to connect to second device 130 may transmit, to second device 130, a response of connecting to second device 130 and second device 130 may receive the response from third device 140.

Upon exchanging the requests and responses, a provisional ad-hoc network group may be configured. First device 120, second device 130 and third device 140 may be included in the provisional ad-hoc network group. First device 120, second device 130 and third device 140 which are included in the provisional ad-hoc network group may further exchange information regarding each device such as Internet Protocol (IP) address of each of first device 120, second device 130 and third device 140, a media access control (MAC) address of each of first device 120, second device 130 and third device 140 and so forth.

First device 120 may calculate a network load difference between each network load of first device 120, second device 130 and third device 140. For calculating the network load difference, first device 120 may calculate the network load of first device 120. In some embodiments, first device 120 may calculate the network load of first device 120 based at least in part on contents information regarding contents to which first device 120 accesses. By way of example, but not limitation, the contents information may include at least one of Uniform Resource Locator (URL) or Internet Protocol (IP) address of a website to which first device 120 accesses. First device 120 may derive at least one of characters, images or texts from the obtained contents information as keywords. Then, first device 120 may calculate the network load of first device 120 based on the keywords derived from the obtained contents information.

Further, second device 130 may obtain contents information regarding contents to which second device 130 accesses. By way of example, but not limitation, the contents information may include at least one of Uniform Resource Locator (URL) or Internet Protocol (IP) address of a website to which second device 130 accesses. Second device 130 may derive at least one of characters, images or texts from the obtained contents information as keywords. In some embodiments, second device 130 may transmit the keywords derived from the obtained contents information to first device 120. Upon receiving the keywords derived from the obtained contents information from second device 130, first device 120 may calculate the network load of second device 130 based on the received keywords.

Similarly, third device 140 may obtain contents information regarding contents to which third device 140 accesses and derive keywords from the contents information. Then, third device 140 may transmit the keywords to first device 120. Upon receiving the keywords derived from the obtained contents information from third device 140, first device 120 may calculate the network load of third device 140 based on the received keywords.

In some embodiments, second device 130 by itself may calculate the network load of second device 130 based on the keywords derived from the obtained contents information. Further, second device 130 may transmit the calculated network load of second device 130 to first device 120 and the calculated network load of second device 130 may be received by first device 120.

Further, third device 140 by itself may calculate the network load of third device 140 based on the keywords derived from the obtained contents information. Further, third device 140 may transmit the calculated network load of third device 140 to first device 120 and the calculated network load of third device 140 may be received by first device 120.

In some embodiments, first device 120 may calculate the network load difference between each network load of first device 120, second device 130 and third device 140. Further, first device 120 may determine whether the network load difference between the network load of first device 120 and the network load of second device 130 is larger than a predetermined value. Further, first device 120 may determine whether the network load difference between the network load of second device 130 and the network load of third device 140 is larger than the predetermined value.

Upon determining, if the network load difference between the network load of first device 120 and the network load of second device 130 is the same with or smaller than the predetermined value and the network load difference between the network load of second device 130 and the network load of third device 140 is the same with or smaller than the predetermined value, as illustrated in FIG. 1A, first device 120 may configure an ad-hoc network group 150 including first device 120, second device 130 and third device 140. Then, first device 120 may provide a wireless local area network to second device 130 and third device 140 included in ad-hoc network group 150. The wireless local area network provided by first device 120 may include a Wi-Fi network provided by access point 110.

First device 120, second device 130 and third device 140 which are included in ad-hoc network group 150 may exchange signals informing that first device 120, second device 130 and third device 140 are included in ad-hoc network group 150 with a certain intervals. In some embodiments, first device 120 may transmit a signal informing that first device 120 is included in ad-hoc network group 150 to second device 130 and receive a signal informing that second device 130 is included in ad-hoc network group 150 from second device 130. Further, second device 130 may transmit a signal informing that second device 130 is included in ad-hoc network group 150 to first device 120 and third device 140. Further second device 130 may receive a signal informing that third device 140 is included in ad-hoc network group 150 from third device 140 and the signal informing that first device 120 is included in ad-hoc network group 150 from first device 120. Further third device 140 may transmit the signal informing that third device 140 is included in ad-hoc network group 150 to second device 130 and receive the signal informing that second device 130 is included in ad-hoc network group 150 from second device 130.

Further, after configuring ad-hoc network group 150, first device 120 may check if the network load of second device 130 or third device 140 is changed to be considerably different from the network load of neighboring devices. By way of example, but not limited to, if the network load difference between the network load of first device 120 and the network load of third device 140 becomes larger than the predetermined value, first device 120 may instruct third device 140 to leave ad-hoc network group 150.

In some embodiments, if the network load difference between the network load of first device 120 and the network load of second device 130 is larger than the predetermined value, first device 120 may instruct second device 130 to leave the provisional ad-hoc network group. For example, if a movie which requires a large amount of network load is played on first device 120 but an e-mail which relatively requires a small amount of network load is loaded on second device 130, the network load difference between the network load of first device 120 and the network load of second device 130 may be considerable. Then, first device 120 may instruct second device 130 on which the e-mail is loaded to leave the provisional ad-hoc network group.

Further, if the network load difference between the network load of second device 130 and the network load of third device 140 is larger than the predetermined value, first device 120 may instruct second device 130 or third device 140 to leave the provisional ad-hoc network group. For example, if an e-mail which relatively requires a small amount of network load is loaded on second device 130 while a game which requires a large amount of network load is played on third device 140, the network load difference between the network load of second device 130 and the network load of third device 140 may be considerable. Then, first device 120 may instruct second device 130 to leave the provisional ad-hoc network group. As a result, as illustrated in FIG. 1B, an ad-hoc network group 160 including first device 120 and third device 140, where the respective network loads are similar with each other, may be configured. Then, first device 120 may provide a wireless local area network to third device 140 included in ad-hoc network group 160.

Further, after configuring ad-hoc network group 160, first device 120 may check if the network load of third device 140 is changed to be considerably different from the network load of first device 120. If the network load of third device 140 becomes small, so that the network load difference between the network load of first device 120 and the network load of third device 140 becomes larger than the predetermined value, first device 120 may instruct third device 140 to leave ad-hoc network group 160.

Figure 2:
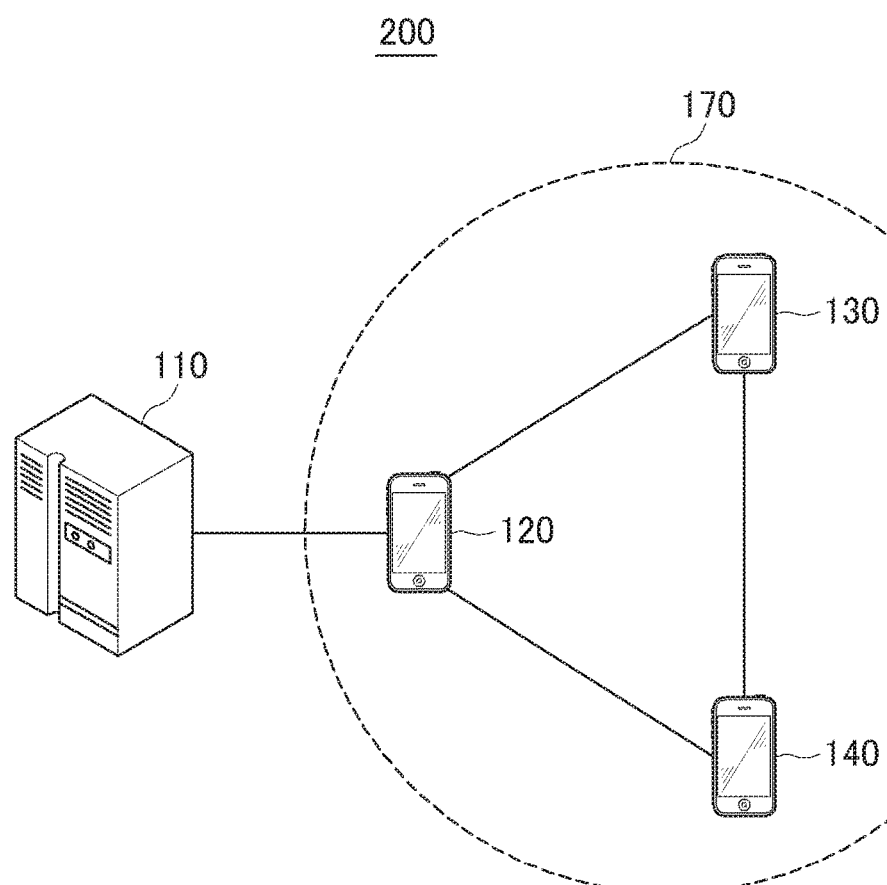
FIG. 2 schematically shows yet another illustrative example of a network communications environment including an access point, a first device, a second device and a third device, arranged in accordance with at least some embodiments described herein.

FIG. 2 schematically shows yet another illustrative example of a network communications environment 200 including access point 110, first device 120, second device 130 and third device 140, arranged in accordance with at least some embodiments described herein. As illustrated in FIG. 2, first device 120 may connect to access point 110. In accordance with at least one example embodiment, first device 120 may transmit requests of connecting to first device 120 to second device 130 and third device 140. If second device 130 and third device 140 want to connect to first device 120, second device 130 and third device 140 may respectively transmit, to first device 120, a response of connecting to first device 120 and first device 120 may receive the responses from second device 130 and third device 140.

Upon exchanging the requests and responses, a provisional ad-hoc network group may be configured. First device 120, second device 130 and third device 140 may be included in the provisional ad-hoc network group.

First device 120 may configure an ad-hoc network group 170 that includes first device 120, second device 130 and third device 140 based on a network load of each of first device 120, second device 130 and third device 140. As described with reference to FIGS. 1A and 1B above, first device 120 may obtain the network load of each of first device 120, second device 130 and third device 140.

In some embodiments, first device 120 may calculate the network load difference between each network load of first device 120, second device 130 and third device 140. In such cases, first device 120 may determine whether the network load difference between the network load of first device 120 and the network load of second device 130 is smaller than a predetermined value. Further, first device 120 may determine whether the network load difference between the network load of first device 120 and the network load of third device 140 is smaller than the predetermined value.

Upon determining, if the network load difference between the network load of first device 120 and the network load of second device 130 is larger than the predetermined value and the network load difference between the network load of first device 120 and the network load of third device 140 is larger than the predetermined value, as illustrated in FIG. 2, first device 120 may configure an ad-hoc network group 170 including first device 120, second device 130 and third device 140. By way of example, but not limitation, if a movie which requires a large amount of network load is played on first device 120 but an e-mail which relatively requires a small amount of network load is loaded on second device 130, the network load difference between the network load of first device 120 and the network load of second device 130 may be larger than the predetermined value. Further, if a movie which requires a large amount of network load is played on first device 120 but a twitter which relatively requires a small amount of network load is played on third device 140, the network load difference between the network load of first device 120 and the network load of third device 140 may be larger than the predetermined value.

Consequently, first device 120 whose the network load is relatively large and second device 130 and third device 140 whose the network loads are much smaller that of first device 120 may be included in the same ad-hoc network group 170. Then, first device 120 may provide a wireless local area network to second device 130 and third device 140 included in ad-hoc network group 170. The wireless local area network provided by first device 120 may include a Wi-Fi network.

Alternatively, upon determining, if the network load difference between the network load of first device 120 and the network load of second device 130 is the same with or smaller than the predetermined value, first device 120 may instruct second device 130 to leave the provisional ad-hoc network group. By way of example, but not limitation, if a movie which requires a large amount of network load is played on first device 120 and a game which requires a large amount of network load is played on second device 130, the network load difference between the network load of first device 120 and the network load of second device 130 may be smaller than the predetermined value. Then, first device 120 may instruct second device 130 to leave the provisional ad-hoc network group. As a result, first device 120 may configure an ad-hoc network group including first device 120 and third device 140.

Further, after configuring ad-hoc network group 170, first device 120 may check if the network loads of second device 130 and third device 140 are changed so that the network load difference between the network load of first device 120 and the network load of second device 130 and the network load of first device 120 and the network load of third device 140 become smaller than the predetermined value. By way of example, but not limited to, if the network load of third device 140 becomes large, so that the network load difference between the network load of first device 120 and the network load of third device 140 becomes smaller than the predetermined value, first device 120 may instruct third device 140 to leave ad-hoc network group 170.

Further, in some embodiments, first device 120 may calculate a total network load of ad-hoc network group 170 periodically. The total network load of ad-hoc network group 170 may be calculated by aggregating the network load of each of first device 120, second device 130 and third device 140.

First device 120 may compare the calculated total network load of ad-hoc network group 170 with an available network load of access point 110 periodically. Upon comparing, if the total network load is larger than the available network load of access point 110, first device 120 may instruct second device 130 and/or third device 140 to leave ad-hoc network group 170. By way of example, but not limited to, if the network load of third device 140 is changed to be large since the twitter has terminated and a game is played on third device 140, the total network load of ad-hoc network group 170 may be increased consequently. Accordingly, the total network load may become larger than the available network load of access point 110. Then, first device 120 may instruct third device 140 to leave ad-hoc network group 170.

Figure 3:
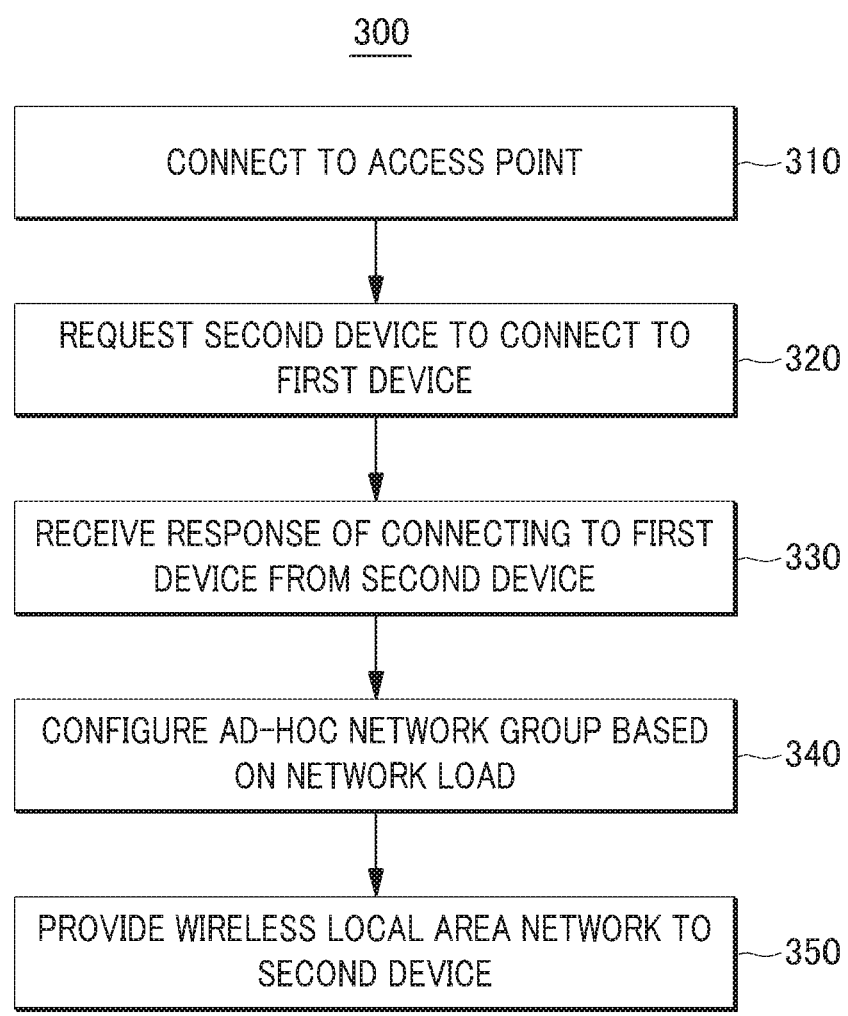
FIG. 3 shows an example flow diagram of a process of a first device for providing a wireless local area network to a second device, arranged in accordance with at least some embodiments described herein.

FIG. 3 shows an example flow diagram of a process 300 of first device 120 for providing a wireless local area network to second device 130, arranged in accordance with at least some embodiments described herein. The method in FIG. 3 may be implemented in communications environments 100, 101 and 200 including access point 110, first device 120, second device 130 and third device 140, as illustrated in FIGS. 1A, 1B and 2. An example process may include one or more operations, actions, or functions as illustrated by one or more blocks 310, 320, 330, 340 and/or 350. Although illustrated as discrete blocks, various blocks may be divided into additional blocks, combined into fewer blocks, or eliminated, depending on the desired implementation. Processing may begin at block 310.

At block 310 (Connect to Access Point), first device 120 may connect to access point 110. Access point 110 may provide a wireless local area network to first device 120. Processing may proceed from block 310 to block 320.

At block 320 (Request Second Device to Connect to First Device), first device 120 may request second device 130 to connect to first device 120. In some embodiments, first device 120 may transmit a request of connecting to first device 120 to second device 130. Processing may proceed from block 320 to block 330.

At block 330 (Receive Response from Second Device), first device 120 may receive a response of connecting to first device 120 from second device 130. Then, a provisional ad-hoc network group including first device 120 and second device 130 may be configured. Processing may proceed from block 330 to block 340.

At block 340 (Configure Ad-hoc Network Group based on Network Load), first device 120 may configure an ad-hoc network group based on a network load of first device 120 and a network load of second device 130. Processing may proceed from block 340 to block 350.

At block 350 (Provide Wireless Local Area Network), first device 120 may provide a wireless local area network to second device 130 included in the ad-hoc network group configured at block 340. The wireless local area network provided by first device 120 may include a Wi-Fi network.

Figure 4:
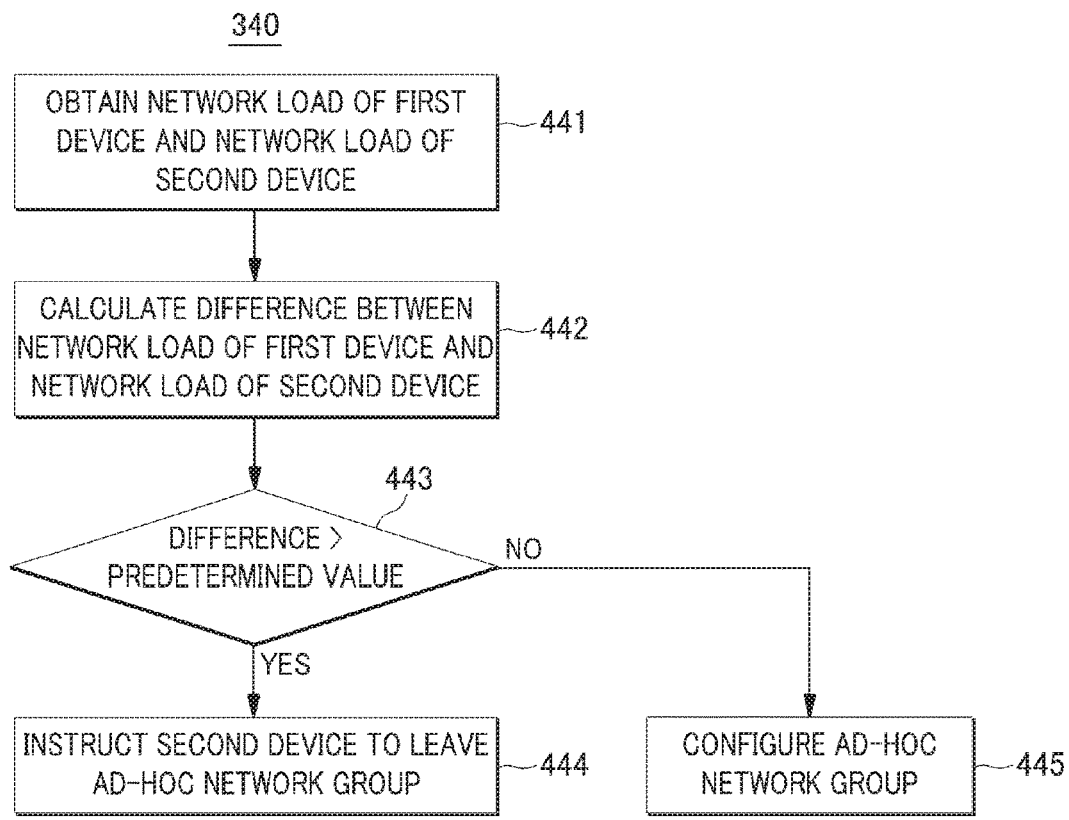
FIG. 4 shows a further example flow diagram of a process of FIG. 3, arranged in accordance with at least some embodiments described herein.

FIG. 4 shows a further example flow diagram of process at block 340 of FIG. 3, arranged in accordance with at least some embodiments described herein. The process in FIG. 4 may be implemented in communications environments 100, 101 and 200 including access point 110, first device 120, second device 130 and third device 140, as illustrated in FIGS. 1A, 1B and 2. An example process may include one or more operations, actions, or functions as illustrated by one or more blocks 441, 442, 443, 444 and/or 445. Although illustrated as discrete blocks, various blocks may be divided into additional blocks, combined into fewer blocks, or eliminated, depending on the desired implementation. Processing may begin at block 441.

At block 441 (Obtain Network Load of First Device and Network Load of Second Device), first device 120 may obtain the network load of first device 120 and the network load of second device 130. In some embodiments, as described above with reference to FIG. 1A, first device 120 may calculate the network load of first device 120 and the network load of second device 130. In some other embodiments, as described above with reference to FIG. 1A, second device 130 may calculate the network load of second device 130 and transmit the calculated network load of second device 130 to first device 120 so that first device 120 obtains the network load of second device 130. Processing may proceed from block 441 to block 442.

At block 442 (Calculate Difference between Network Load of First Device and Network Load of Second Device), first device 120 may calculate a network load difference between the network load of first device 120 and the network load of second device 130. Processing may proceed from block 442 to block 443.

At block 443 (Determine whether Difference is larger than Predetermined Value), first device 120 may determine whether the calculated network load difference between the network load of first device 120 and the network load of second device 130 is larger than a predetermined value.

If first device 120 determines at block 443 that the calculated network load difference between the network load of first device 120 and the network load of second device 130 is larger than the predetermined value, processing may proceed to block 444, while if first device 120 determines at block 443 that the calculated network load difference between the network load of first device 120 and the network load of second device 130 is the same with or smaller than the predetermined value, processing may proceed to block 445.

At block 444 (Instruct Second Device to Leave Ad-hoc Network Group), first device 120 may instruct second device 130 to leave the provisional ad-hoc network group configured at block 330 of FIG. 3.

At block 445 (Configure Ad-hoc Network Group), first device 120 may configure an ad-hoc network group including first device 120 and second device 130.

Figure 5:
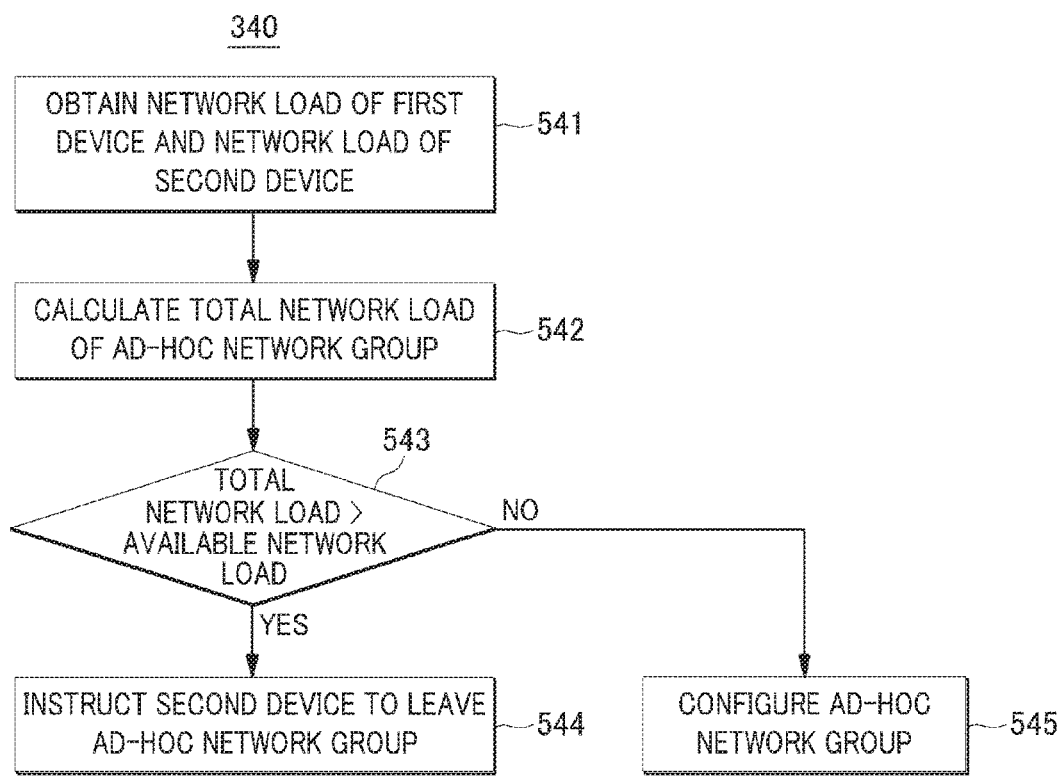
FIG. 5 shows another further example flow diagram of a process of FIG. 3, arranged in accordance with at least some embodiments described herein.

FIG. 5 shows another further example flow diagram of process at block 340 of FIG. 3, arranged in accordance with at least some embodiments described herein. The process in FIG. 5 may be implemented in communications environments 100, 101 and 200 including access point 110, first device 120, second device 130 and third device 140, as illustrated in FIGS. 1A, 1B and 2. An example process may include one or more operations, actions, or functions as illustrated by one or more blocks 541, 542, 543, 544 and/or 545. Although illustrated as discrete blocks, various blocks may be divided into additional blocks, combined into fewer blocks, or eliminated, depending on the desired implementation. Processing may begin at block 541.

At block 541 (Obtain Network Load of First Device and Network Load of Second Device), first device 120 may obtain the network load of first device 120 and the network load of second device 130. In some embodiments, as described above with reference to FIG. 1A, first device 120 may calculate the network load of first device 120 and the network load of second device 130. In some other embodiments, as described above with reference to FIG. 1A, second device 130 may calculate the network load of second device 130 and transmit the calculated network load of second device 130 to first device 120 so that first device 120 obtains the network load of second device 130. Processing may proceed from block 541 to block 542.

At block 542 (Calculate Total Network Load of Ad-hoc Network), first device 120 may calculate a total network load of the provisional ad-hoc network group configured at block 330 of FIG. 3 periodically. The total network load of the provisional ad-hoc network group may be calculated by aggregating the network load of first device 120 and the network of second device 130, each of which is obtained at block 541. Processing may proceed from block 542 to block 543.

At block 543 (Compare Total Network Load with Available Network Load), first device 120 may compare the calculated total network load of the provisional ad-hoc network group with an available network load of access point 110 periodically.

If first device 120 determines at block 543 that the calculated total network load of the provisional ad-hoc network group is larger than the available network load of access point 110, processing may proceed to block 544, while if first device 120 determines at block 543 that the calculated total network load of the provisional ad-hoc network group is the same with or smaller than the available network load of access point 110, processing may proceed to block 545.

At block 544 (Instruct Second Device to Leave Ad-hoc Network Group), first device 120 may instruct second device 130 to leave the provisional ad-hoc network group configured at block 330 of FIG. 3.

At block 545 (Configure Ad-hoc Network Group), first device 120 may configure an ad-hoc network group including first device 120 and second device 130.

Figure 6:
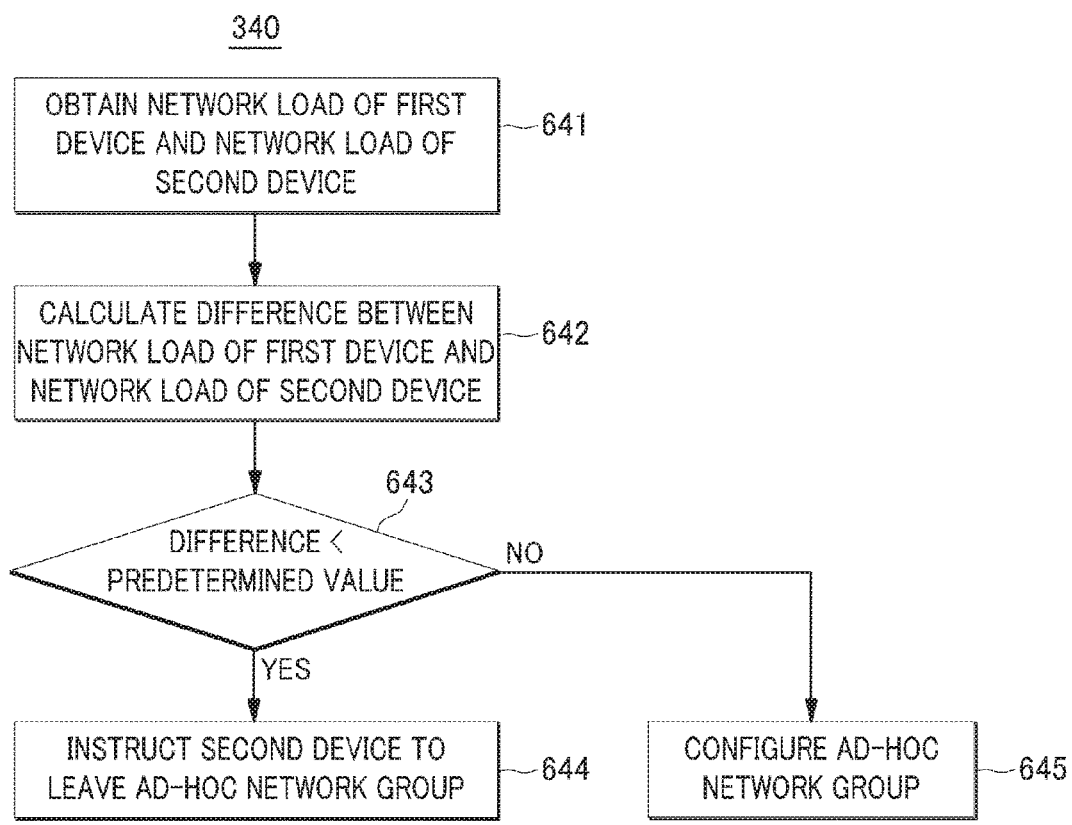
FIG. 6 shows yet another further example flow diagram of a process of FIG. 3, arranged in accordance with at least some embodiments described herein.

FIG. 6 shows yet another further example flow diagram of process at block 340 of FIG. 3, arranged in accordance with at least some embodiments described herein. The process in FIG. 6 may be implemented in communications environments 100, 102 and 200 including access point 110, first device 120, second device 130 and third device 140, as illustrated in FIGS. 1A, 1B and 2. An example process may include one or more operations, actions, or functions as illustrated by one or more blocks 641, 642, 643, 644 and/or 645. Although illustrated as discrete blocks, various blocks may be divided into additional blocks, combined into fewer blocks, or eliminated, depending on the desired implementation. Processing may begin at block 641.

At block 641 (Obtain Network Load of First Device and Network Load of Second Device), first device 120 may obtain the network load of first device 120 and the network load of second device 130. In some embodiments, as described above with reference to FIG. 1A, first device 120 may calculate the network load of first device 120 and the network load of second device 130. In some other embodiments, as described above with reference to FIG. 1A, second device 130 may calculate the network load of second device 130 and transmit the calculated network load of second device 130 to first device 120 so that first device 120 obtains the network load of second device 130. Processing may proceed from block 641 to block 642.

At block 642 (Calculate Difference between Network Load of First Device and Network Load of Second Device), first device 120 may calculate a network load difference between the network load of first device 120 and the network load of second device 130. Processing may proceed from block 642 to block 643.

At block 643 (Determine whether Difference is smaller than Predetermined Value), first device 120 may determine whether the calculated network load difference between the network load of first device 120 and the network load of second device 130 is smaller than a predetermined value.

If first device 120 determines at block 643 that the calculated network load difference between the network load of first device 120 and the network load of second device 130 is smaller than the predetermined value, processing may proceed to block 644, while if first device 120 determines at block 643 that the calculated network load difference between the network load of first device 120 and the network load of second device 130 is the same with or larger than the predetermined value, processing may proceed to block 645.

At block 644 (Instruct Second Device to Leave Ad-hoc Network Group), first device 120 may instruct second device 130 to leave the provisional ad-hoc network group configured at block 330 of FIG. 3.

At block 645 (Configure Ad-hoc Network Group), first device 120 may configure an ad-hoc network group including first device 120 and second device 130.

Figure 7:
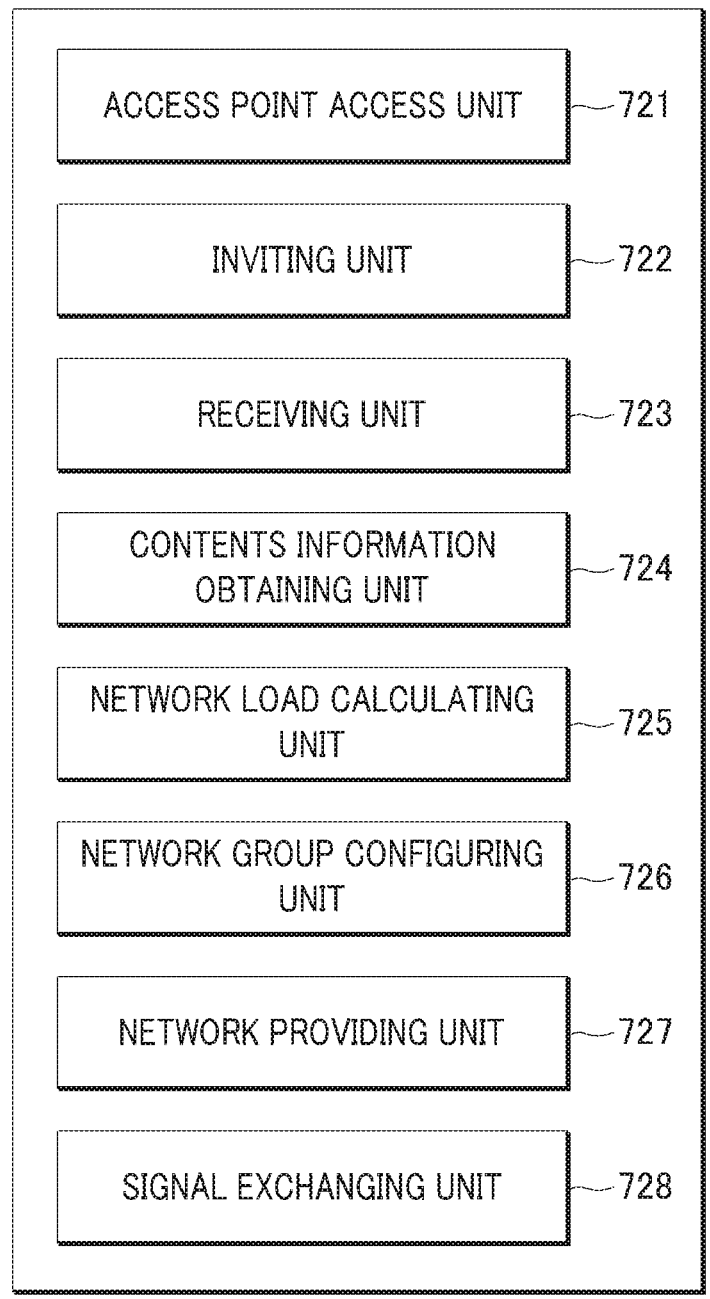
FIG. 7 shows a schematic block diagram illustrating an example architecture for a first device that may configure an ad-hoc network group, arranged in accordance with at least some embodiments described herein.

FIG. 7 shows a schematic block diagram illustrating an example architecture for first device 120 that may configure an ad-hoc network group, arranged in accordance with at least some embodiments described herein. As depicted in FIG. 7, first device 120 may include an access point access unit 721, an inviting unit 722, a receiving unit 723, a contents information obtaining unit 724, a network load calculating unit 725, a network group configuring unit 726, a network providing unit 727, and a signal exchanging unit 728. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of access point access unit 721, inviting unit 722, receiving unit 723, contents information obtaining unit 724, network load calculating unit 725, network group configuring unit 726, network providing unit 727, and signal exchanging unit 728 may be included in an instance of an application hosted on first device 120.

Access point access unit 721 may be configured to connect to access point 110 which provides a wireless local area network. Access point 110 may include a Wi-Fi access point and the wireless local area network provided by access point 110 may include a Wi-Fi network.

Inviting unit 722 may be configured to invite second device 130 to connect to first device 120. In some embodiments, first device 120 may transmit a request of connecting to first device 120 to second device 130.

Receiving unit 723 may be configured to receive a response of connection to first device 120 from second device 130. Further, in some embodiments, receiving unit 723 may be configured to receive, from second device 130, information regarding a network load of second device 130. Second device 130 may calculate the network load of second device 130 and transmit the calculated network load of second device 130 to receiving unit 723. Further, in some other embodiments, receiving unit 723 may be configured to receive, from second device 130, contents information regarding contents to which second device 130 accesses. Second device 130 may obtain contents information regarding contents to which second device 130 accesses. For example, the contents information may include at least one of Uniform Resource Locator (URL) or Internet Protocol (IP) address of a website to which second device 130 accesses. Second device 130 may derive at least one of characters, images or texts from the obtained contents information as keywords. Then, second device 130 may transmit the keywords derived from the obtained contents information to receiving unit 723.

Contents information obtaining unit 724 may be configured to obtain contents information regarding contents to which first device 120 accesses. For example, the contents information may include at least one of Uniform Resource Locator (URL) or Internet Protocol (IP) address of a website to which first device 120 accesses. Contents information obtaining unit 724 may derive at least one of characters, images or texts from the obtained contents information as keywords.

Network load calculating unit 725 may be configured to calculate a network load of first device 120 based on the contents information obtained by contents information obtaining unit 724. Further, network load calculating unit 725 may be configured to calculate a network load of second device 130 based on the contents information of second device 130 received by receiving unit 723.

In some embodiments, network load calculating unit 725 may be configured to calculate a network load difference between the network load of first device 120 and the network load of second device 130. Further, network load calculating unit 725 may be configured to determine whether the network load difference is larger than a predetermined value.

In some embodiments, network load calculating unit 725 may be configured to calculate a total network load of an ad-hoc network group including first device 120 and second device 130. Further, network load calculating unit 725 may be configured to compare the total network load with an available network load of access point 110 periodically.

In some embodiments, network load calculating unit 725 may be configured to calculate a network load difference between the network load of first device 120 and the network load of second device 130. Further, network load calculating unit 725 may be configured to determine whether the network load difference is smaller than a predetermined value.

Network group configuring unit 726 may be configured to configure the ad-hoc network group including first device 120 and second device 130 based on the network load of first device 120 and the network load of second device 130. In some embodiments, if network load calculating unit 725 determines that the network load difference between the network load of first device 120 and the network load of second device 130 is the same with or smaller than the predetermined value, network group configuring unit 726 may configure the ad-hoc network group including first device 120 and second device 130. Further, if network load calculating unit 725 determines that the network load difference between the network load of first device 120 and the network load of second device 130 is larger than the predetermined value, network group configuring unit 726 may instruct second device 130 to leave the ad-hoc network group.

In some embodiments, if network load calculating unit 725 determines that the total network load is the same with or smaller than the available network load of access point 110, network group configuring unit 726 may configure the ad-hoc network group including first device 120 and second device 130. Further, if network load calculating unit 725 determines that the total network load is larger than the available network load of access point 110, network group configuring unit 726 may instruct second device 130 to leave the ad-hoc network group.

In some embodiments, if network load calculating unit 725 determines that the network load difference between the network load of first device 120 and the network load of second device 130 is the same with or larger than the predetermined value, network group configuring unit 726 may configure the ad-hoc network group including first device 120 and second device 130. While, if network load calculating unit 725 determines that the network load difference between the network load of first device 120 and the network load of second device 130 is smaller than the predetermined value, network group configuring unit 726 may instruct second device 130 to leave the ad-hoc network group.

Network providing unit 727 may be configured to provide a wireless local area network to second device 130 included in the ad-hoc network group. The wireless local area network provided by network providing unit 727 may include a Wi-Fi network.

Signal exchanging unit 728 may be configured to transmit a signal informing that first device 120 is included in the ad-hoc network group to second device 130. Further, signal exchanging unit 728 may be configured to receive a signal informing that second device 130 is included in the ad-hoc network group from second device 130.

Figure 8:
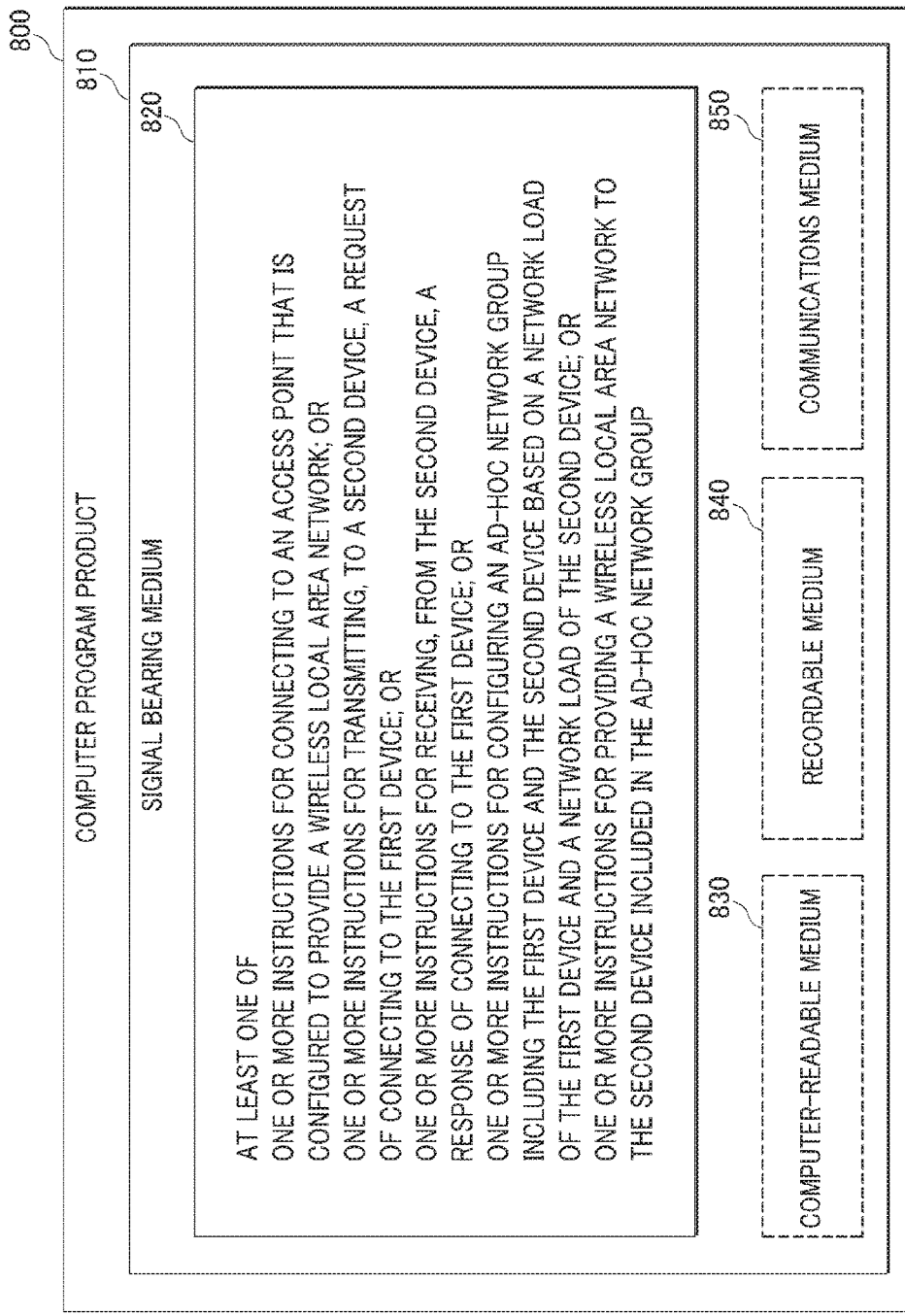
FIG. 8 illustrates a computer program product that may be utilized to provide a scheme for providing wireless local area networks, arranged in accordance with at least some embodiments described herein.

FIG. 8 illustrates a computer program product that may be utilized to provide a scheme for providing wireless local area networks, arranged in accordance with at least some embodiments described herein. Computer program product 800 may include a signal bearing medium 810. Signal bearing medium 810 may include one or more instructions 820 that, when executed by, for example, a processor, may provide the functionality described above with respect to FIGS. 1A-7. By way of example, but not limitation, instructions 820 may include: one or more instructions for connecting to an access point that is configured to provide a wireless local area network; one or more instructions for transmitting, to a second device, a request of connecting to the first device; one or more instructions for receiving, from the second device, a response of connecting to the first device; one or more instructions for configuring an ad-hoc network group including the first device and the second device based, at least in part, on a network load of the first device and a network load of the second device; and one or more instructions for providing a wireless local area network to the second device included in the ad-hoc network group. Thus, for example, referring to FIG. 3, first device 120 may undertake one or more of the blocks shown in FIG. 3 in response to instructions 820.

In some implementations, signal bearing medium 810 may encompass a computer-readable medium 830, such as, but not limited to, a hard disk drive, a CD, a DVD, a digital tape, memory, etc. In some implementations, signal bearing medium 810 may encompass a recordable medium 840, such as, but not limited to, memory, read/write (R/W) CDs, R/W DVDs, etc. In some implementations, signal bearing medium 810 may encompass a communications medium 850, such as, but not limited to, a digital and/or an analog communication medium (e.g., a fiber optic cable, a waveguide, a wired communications link, a wireless communication link, etc.). Thus, for example, computer program product 800 may be conveyed to one or more modules of first device 120 by an RF signal bearing medium 810, where the signal bearing medium 810 is conveyed by a wireless communications medium 850 (e.g., a wireless communications medium conforming with the IEEE 802.11 standard).

Figure 9:
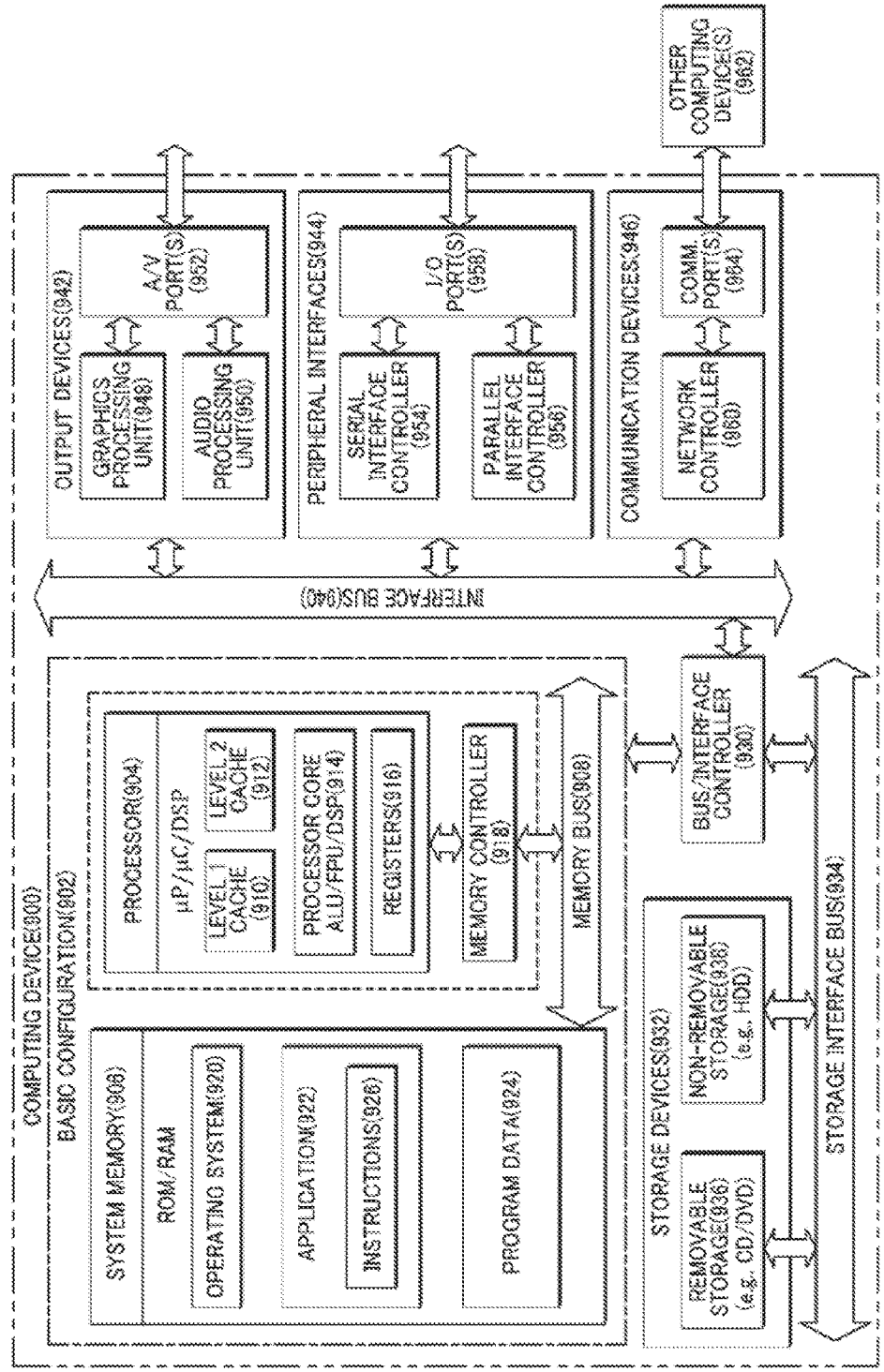
FIG. 9 is a block diagram illustrating an example computing device that may be utilized to provide a scheme for providing wireless local area networks, arranged in accordance with at least some embodiments described herein.

FIG. 9 is a block diagram illustrating an example computing device that may be utilized to provide a scheme for providing wireless local area networks, arranged in accordance with at least some embodiments described herein. In these examples, elements of computing device 900 may be arranged or configured for a device. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (μP), a microcontroller (μC), a digital signal processor (DSP), or any combination thereof. Processor 904 may include one more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, an application 922, and program data 924. Application 922 may include instructions 926 that may be arranged to perform the functions as described herein including the actions described with respect to first device 120 architecture as shown in FIG. 7 or including the actions described with respect to the flow charts shown in FIGS. 3 to 6. In some examples, application 922 may be arranged to operate with program data 924 on an operating system 920 such that the schemes for providing wireless local area networks as described herein may be provided.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc.

As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method, comprising:
    connecting, by a first device, to an access point that provides a wireless local area network to the first device;
    transmitting, by the first device to a second device, a first request for the second device to connect to the first device;
    receiving, by the first device from the second device, a first response to the first request to connect to the first device,
        wherein the second device transmits, to a third device, a second request for the third device to connect to the second device, and
        wherein the second device receives, from the third device, a second response to the second request to connect to the second device;
    responsive to at least one of the first and second requests and the first and second responses, configuring, by the first device, a provisional ad-hoc network group that includes the first device, the second device, and the third device;
    determining, by the first device, a first network load of the first device, a second network load of the second device, and a third network load of the third device;
    configuring, by the first device, an ad-hoc network group, based at least on two of the first network load of the first device, the second network load of the second device, and the third network load of third device; and
    providing, by the first device, the wireless local area network to one or more devices included in the ad-hoc network group.

2. The method of claim 1, wherein the ad-hoc network group includes the first device, the second device, and the third device.

3. The method of claim 1, wherein the ad-hoc network group includes the first device and one of the second device and the third device.

4. The method of claim 1, wherein the first network load of the first device, the second network load of the second device, and the third network load of the third device correspond to the wireless local area network provided to the first device, the second device, and the third device.

5. The method of claim 1, wherein the configuring, by the first device, the ad-hoc network group based at least on two of the first network load of the first device, the second network load of the second device, and the third network load of third device comprises:
    calculating a network load difference between the first network load of the first device and the second network load of the second device; and
    instructing the second device to leave the provisional ad-hoc network group responsive to a determination that the calculated network load difference is larger than a particular value.

6. The method of claim 1, wherein the configuring, by the first device, the ad-hoc network group comprises:
    calculating a network load difference between the first network load of the first device and the third network load of the third device; and
    instructing the third device to leave the provisional ad-hoc network group responsive to a determination that the calculated network load difference is larger than a particular value.

7. The method of claim 1, wherein the configuring, by the first device, the ad-hoc network group comprises:
    calculating a network load difference between the second network load of the second device and the third network load of the third device; and
    instructing one of the second device and the third device to leave the provisional ad-hoc network group responsive to a determination that the calculated network load difference is larger than a particular value.

8. The method of claim 1, wherein the configuring, by the first device, the ad-hoc network group comprises at least one of:
    calculating a first network load difference between the first network load of the first device and the second network load of the second device;
    calculating a second network load difference between the first network load of the first device and the third network load of the third device; and
    calculating a third network load difference between the second network load of the second device and the third network load of the third device.

9. The method of claim 8, wherein the configuring, by the first device, the ad-hoc network group further comprises at least one of:
    instructing the second device to leave the provisional ad-hoc network group responsive to a determination that the calculated first network load difference is less than or equal to a particular value;
    instructing the third device to leave the provisional ad-hoc network group responsive to a determination that the calculated second network load difference is less than or equal to the particular value; and
    instructing one of the second device and third device to leave the provisional ad-hoc network group responsive to a determination that the calculated third network load difference is less than or equal to the particular value.

10. The method of claim 1, wherein:
    the configuring, by the first device, the ad-hoc network group comprises instructing at least one of the second device and the third device to leave the provisional ad-hoc network group responsive to a determination that a network load of the provisional ad-hoc network group is larger than an available network load of the access point, and
    the network load of the provisional ad-hoc network group includes a sum of the first network load of the first device, the second network load of the second device, and the third network load of the third device.

11. The method of claim 1, further comprising:
subsequent to the configuring the ad-hoc network group, determining, by the first device, whether there is a change in the second network load of the second device and/or the third network load of the third device; and
responsive to a determination of the change in at least one of the second network load of the second device and the third network load of the third device, reconfiguring the ad-hoc network group.

12. The method of claim 1, wherein the connecting to the access point includes connecting to a Wi-Fi access point, and wherein the wireless local area network includes a Wi-Fi network.

13. A system, comprising:
a first device; and
a second device,
wherein the first device includes:
    a first processor operable to connect the first device to an access point that provides a wireless local area network to the first device; and
    a first communication port coupled to the first processor and operable to transmit, to the second device, a first request to connect the second device to the first device, and operable to receive, from the second device, a first response to the first request to connect to the first device,
wherein the second device includes:
    a second communication port operable to transmit, to a third device, a second request to connect the third device to the second device and operable to receive, from the third device, a second response to the second request to connect to the second device, and
wherein the first processor of the first device is further operable to:
    responsive to at least one of the first and second requests and the first and second responses, configure a provisional ad-hoc network group that includes the first device, the second device, and the third device;
    determine a first network load of the first device, a second network load of the second device, and a third network load of the third device;
    configure an ad-hoc network group based at least on two of the first network load of the first device, the second network load of the second device, and the third network load of third device; and
    provide the wireless local area network to one or more devices included in the ad-hoc network group.

14. The system of claim 13, wherein:
the first communication port of the first device is further operable to receive, from the second device, first information regarding content accessed by the second device;
the first processor of the first device is further operable to calculate the second network load of the second device based, at least in part, on the first information;
the first communication port of the first device is further operable to receive, from the third device, second information regarding content accessed by the third device; and
the first processor of the first device is further operable to calculate the third network load of the third device based, at least in part, on the second information.

15. The system of claim 14, wherein to calculate the second network load of the second device, based at least, in part, on the first information, the first processor of the first device is operable to:
derive, from the received first information, at least one of characters, images, or texts as keywords; and
calculate the second network load of the second device based on the derived keywords.

16. The system of claim 14, wherein the first information includes at least one of a uniform resource locator (URL) address or an internet protocol (IP) address of a website accessed by the second device, and wherein the second information includes at least one of a URL address or an IP address of a website accessed by the third device.

17. The system of claim 13, wherein the second device further includes a second processor coupled to the second communication port, wherein the second processor is operable to calculate the second network load of the second device, and wherein the second communication port of the second device is further operable to transmit the calculated second network load to the first device.

18. The system of claim 13, wherein the third device includes:
a third processor operable to calculate the third network load of the third device; and
a third communication port coupled to the third processor and operable to transmit the calculated third network load to the first device.

19. The system of claim 13, wherein the second communication port of the second device is further operable to:
transmit, to the first device and the third device, a signal that indicates that the second device is included in the ad-hoc network group;
receive, from the first device, a signal that indicates that the first device is included in the ad-hoc network group; and
receive, from the third device, a signal that indicates that the third device is included in the ad-hoc network group.

20. The system of claim 13, wherein to configure the ad-hoc network group, the first processor of the first device is operable to perform at least one of:
calculate a first network load difference between the first network load of the first device and the second network load of the second device;
calculate a second network load difference between the first network load of the first device and the third network load of the third device; and
calculate a third network load difference between the second network load of the second device and the third network load of the third device.

21. The system of claim 20, wherein to configure the ad-hoc network group, the first processor of the first device is further operable to perform at least one of:
instruct the second device to leave the provisional ad-hoc network group responsive to a determination that the calculated first network load difference is less than or equal to a particular value;
instruct the third device to leave the provisional ad-hoc network group responsive to a determination that the calculated second network load difference is less than or equal to the particular value; and
instruct one of the second device and third device to leave the provisional ad-hoc network group responsive to a determination that the calculated third network load difference is less than or equal to the particular value.

22. The system of claim 20, wherein to configure the ad-hoc network group, the first processor of the first device is further operable to perform at least one of:

instruct the second device to leave the provisional ad-hoc network group responsive to a determination that the calculated first network load difference is greater than a particular value;

instruct the third device to leave the provisional ad-hoc network group responsive to a determination that the calculated second network load difference is greater than the particular value; and instruct one of the second device and third device to leave the provisional ad-hoc network group responsive to a determination that the calculated third network load difference is greater than the particular value.

23. The system of claim 13, wherein to configure the ad-hoc network group, the first processor of the first device is operable to:

instruct at least one of the second device and the third device to leave the provisional ad-hoc network group responsive to a determination that a network load of the provisional ad-hoc network group is larger than an available network load of the access point, wherein the network load of the provisional ad-hoc network group includes a sum of the first network load of the first device, the second network load of the second device, and the third network load of the third device.

24. A method, comprising:

connecting, by a first device, to an access point that provides a wireless local area network to the first device and a second device; and configuring, by the first device, an ad-hoc network group that includes the first device and the second device based, at least in part, on a network load of the first device and a network load of the second device, wherein the network load of the first device is based on the wireless local area network provided to the first device via the access point, wherein the network load of the second device is based on the wireless local area network provided to the second device via the access point, and wherein the configuring comprises:

calculating a difference between the network load of the first device and the network load of the second device; and determining whether the difference is larger than a particular value; and responsive to a determination that the difference is equal to or less than the particular value, connecting the second device to the wireless local area network via the first device.

\* \* \* \* \*